Sept. 30, 1958 G. W. KILLIAN 2,854,522

MAXIMUM SECURITY AUTOMATIC TELEPHONE SYSTEM

Filed April 1, 1957 4 Sheets-Sheet 1

*INVENTOR.*
GEORGE W. KILLIAN

BY *F. H. Henson*

AGENT

CONNECTOR

Sept. 30, 1958 G. W. KILLIAN 2,854,522

MAXIMUM SECURITY AUTOMATIC TELEPHONE SYSTEM

Filed April 1, 1957 4 Sheets-Sheet 3

CONNECTOR

Sept. 30, 1958 G. W. KILLIAN 2,854,522

MAXIMUM SECURITY AUTOMATIC TELEPHONE SYSTEM

Filed April 1, 1957 4 Sheets-Sheet 4

United States Patent Office 2,854,522

Patented Sept. 30, 1958

2,854,522

MAXIMUM SECURITY AUTOMATIC TELEPHONE SYSTEM

George W. Killian, Rochester, N. Y., assignor to General Dynamics Corporation, Rochester, N. Y., a corporation of Delaware Application April 1, 1957, Serial No. 649,766

6 Claims. (Cl. 179—27)

This invention relates in general to automatic telephone systems and, more particularly, to automatic telephone systems of the maximum security type.

Although the invention herein disclosed is suitable for more general application, it is particularly adapted for use in automatic telephone systems used in penal institutions, or the like. In such systems, it is necessary to provide special service lines, such as guard and fire reporting lines, in addition to the regular service lines. Conventionally, the reporting lines are never marked as busy to the connectors of the system so that any number of reports can be made simultaneously to an attendant's or supervisor's station. Also, it is conventional to identify the calling line at the attendant's station whenever a reporting line is selected so that the location of the calling line can be immediately ascertained and thus preclude the possibility of dispatching personnel or fire equipment to a remote area of the institution in response to a false report.

It is the general object of this invention to provide a new and improved automatic telephone system.

It is a more particular object of this invention to provide a new and improved maximum security telephone system which provides a maximum number of features with a minimum amount of equipment.

Preferably, the connector circuit used in the disclosed system comprises a switch of the type sold under the trademark "XY," and has a set of main brushes and an auxiliary brush. The main brushes, tip, ring, sleeve, and HS, move in a primary direction to select a level of terminals and then move into the banks to select a set of terminals in the selected level while the auxiliary brush, XX, moves only in the primary direction to mark the level selected by the main brushes.

In accordance with the present invention, the special service lines, such as guard reporting, fire reporting, and paging, each terminate in a different level of the terminal banks associated with the connector switch. The special service line in each level is marked as such by the connection of a potential to the HS terminal of the set of terminals corresponding to that line. Thus, by routing the marking potential received over the HS brush, through the XX brush and its associated terminal, the connector circuit is enabled to distinguish between the various special service lines. When the connector is controlled to seize a special service line, as determined by the marking described above, it returns a distinctive marking for that type of special service line over the extended connection to the calling line circuit to operate one or more relays therein. A signal relay in the calling line circuit operates whenever the marking for any special service line is received from the connector and serves to activate an individual signal lamp identifying that calling line at the attendant's station. The signaling relay is then locked up through either a group key at the attendant's station for a first type of report, or in series with another relay and through a group key at the attendant's station for a second type of report. Thus, the supervisor at the attendant's station is able to discriminately extinguish the signaling lamps associated with the various calling lines which have called a particular one of the reporting lines.

In addition to the above, the special service line circuit for paging is arranged in such manner that connections extended thereto can be forcibly released. This is accomplished by removing the marking potential applied to the HS terminal a predetermined time interval after the paging circuit is selected. The connector is responsive to the application of potential to the HS terminal during the predetermined time interval to mark the class of the called line, as previously described. However, if potential is reapplied to said terminal after the predetermined time interval has elapsed, the connector is controlled to forcibly release the extended connection. The potential may be reapplied to the HS terminal after the predetermined time interval has elapsed by the operation of a key at the attendant's station.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise six figures on four sheets. The four sheets of drawings should be arranged in successive order from left to right to show the invention.

Figures 1, 2:
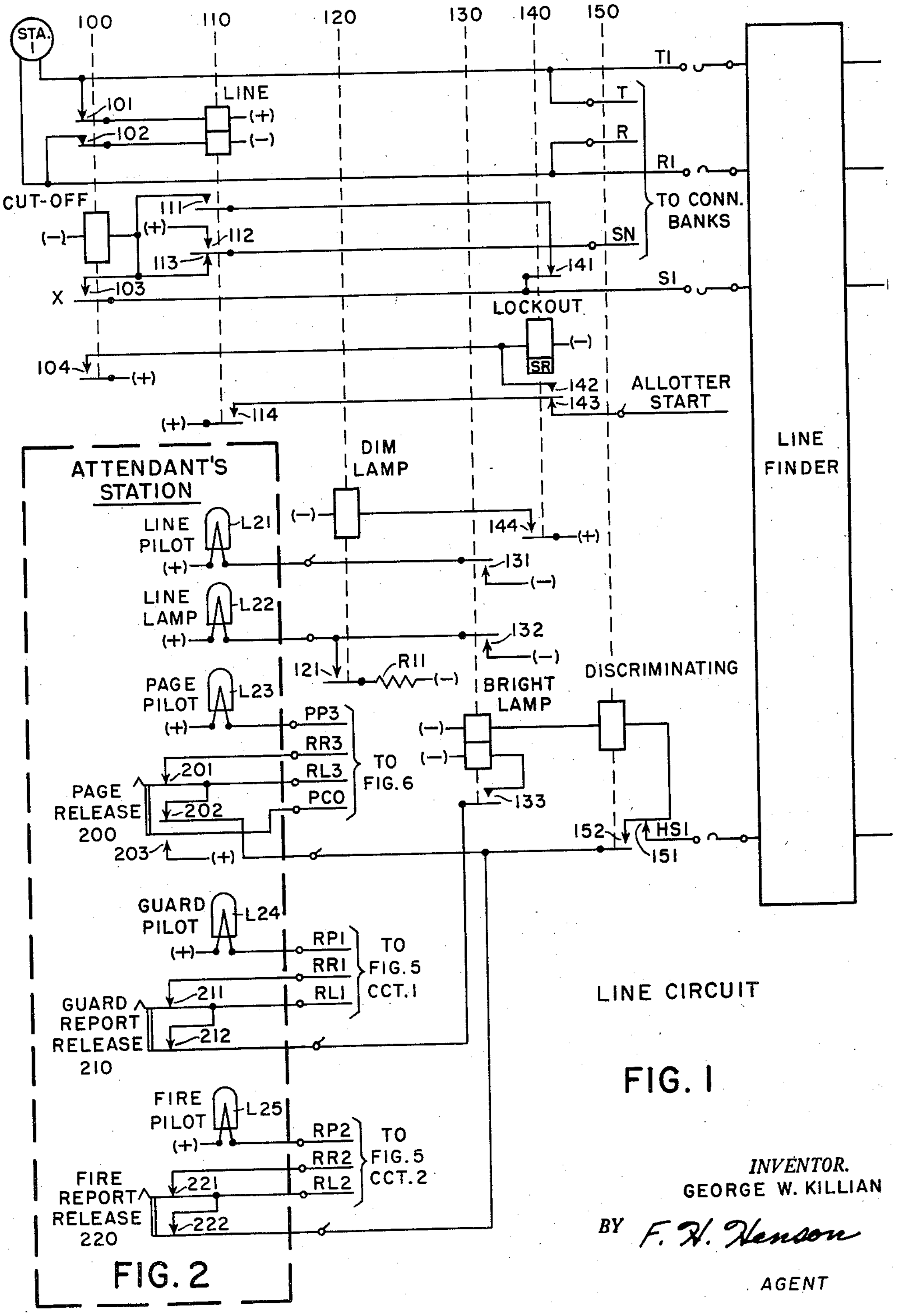
Fig. 1 shows details of a line circuit.
Fig. 2 shows a portion of the equipment at an attendant's station.

It is to be understood that only the details of the circuits necessary to understand the invention have been shown. For example, the connector circuits used in maximum security systems usually include some or all of the following features: executive right-of-way, last party release, no dial alarm, and permanent timing. These circuit details have not been shown since they form no part of the present invention. Also, the system has been shown as a one hundred line system having finder-connector links. It is to be understood that any number of selectors could be used between the line finders and connectors for larger systems.

It is believed that the operation of the system can best be understood by tracing the extension of a call through the system. For this purpose, assume that station STA 1 calls another regular service line. When STA 1 goes off-hook, line relay 110 in the line circuit operates from ground through its upper winding, through break contacts 101 on relay 100, the loop closed at the calling station, through break contacts 102, and through its lower winding to battery. The allotter start conductor is now grounded through contacts 114 on relay 110 and break contacts 143 on relay 140. The allotter is controlled by the application of this ground to initiate the operation of a line finder to find the calling line in the well known manner. Also, at operated contacts 112, relay 110 connects ground to the sleeve conductor SN to mark the calling line circuit busy in the connector banks.

When the line is found by the illustrated line finder, ground potential, which is applied to conductor S1 by succeeding circuits, is routed through break contacts 141 on relay 140, and operated contacts 111 on relay 110 to operate the cutoff relay 100. At its preliminary make contacts 103, relay 100 locks operated to the sleeve ground and at contacts 101 and 102, releases line relay 110. At contacts 104, relay 100 closes an obvious operating circuit for lock-out relay 140. Ground is, of course, disconnected from the allotter start conductor both by the release of relay 110 and the operation of relay 140. At contacts 144, relay 140 closes an operating circuit for the dim lamp relay 120 which, in turn, connects battery through resistor R11 and its operated contacts 121 to illuminate line lamp L22 at the attendant's station. Thus, it can be seen that the line lamp identifying the line circuit of Fig. 1 at the attendant's station is dimly illuminated whenever the line circuit of Fig. 1 is in a calling condition.

Figure 3:
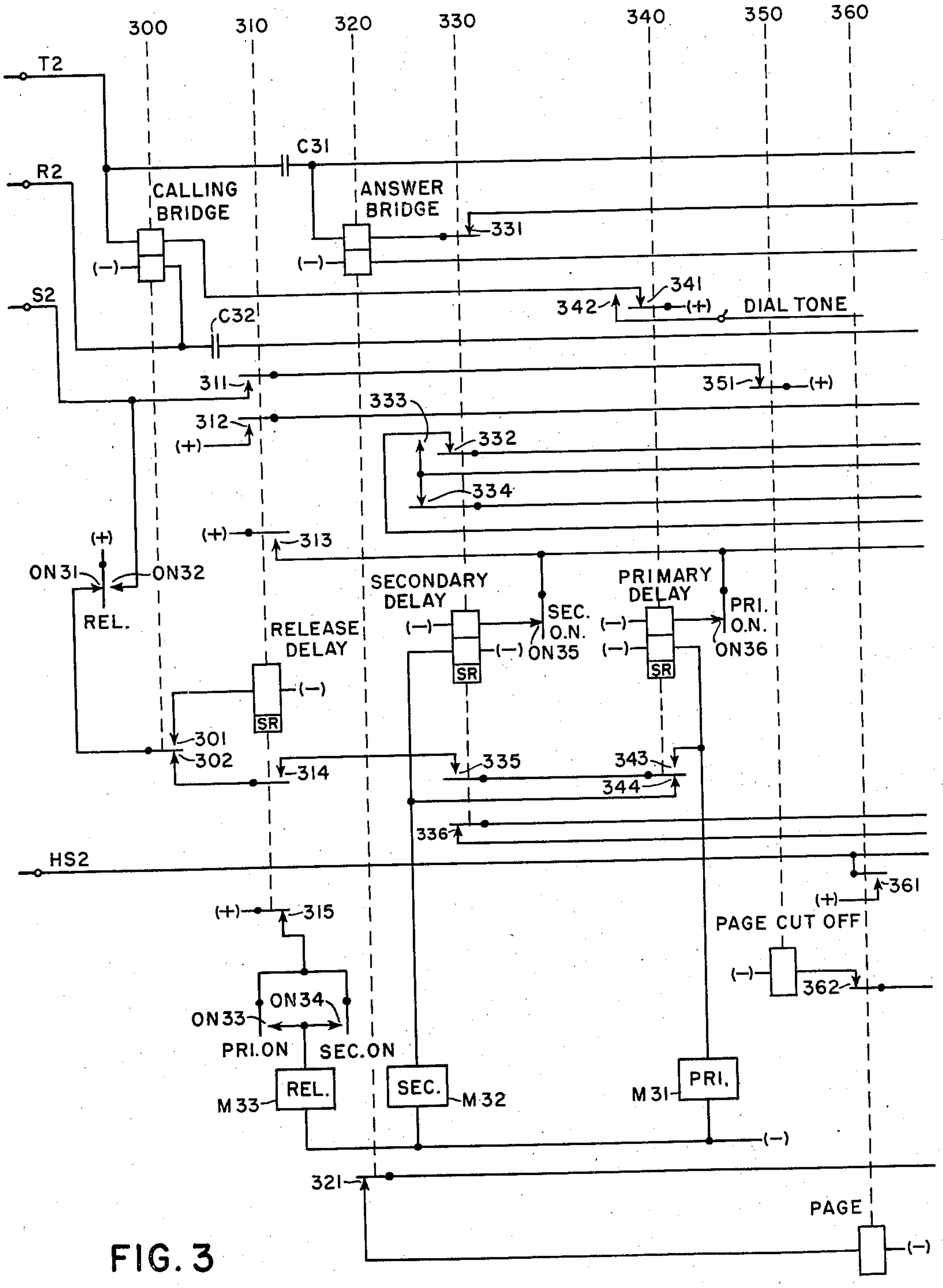
Figs. 3 and 4 show details of a connector circuit.
Figure 4:
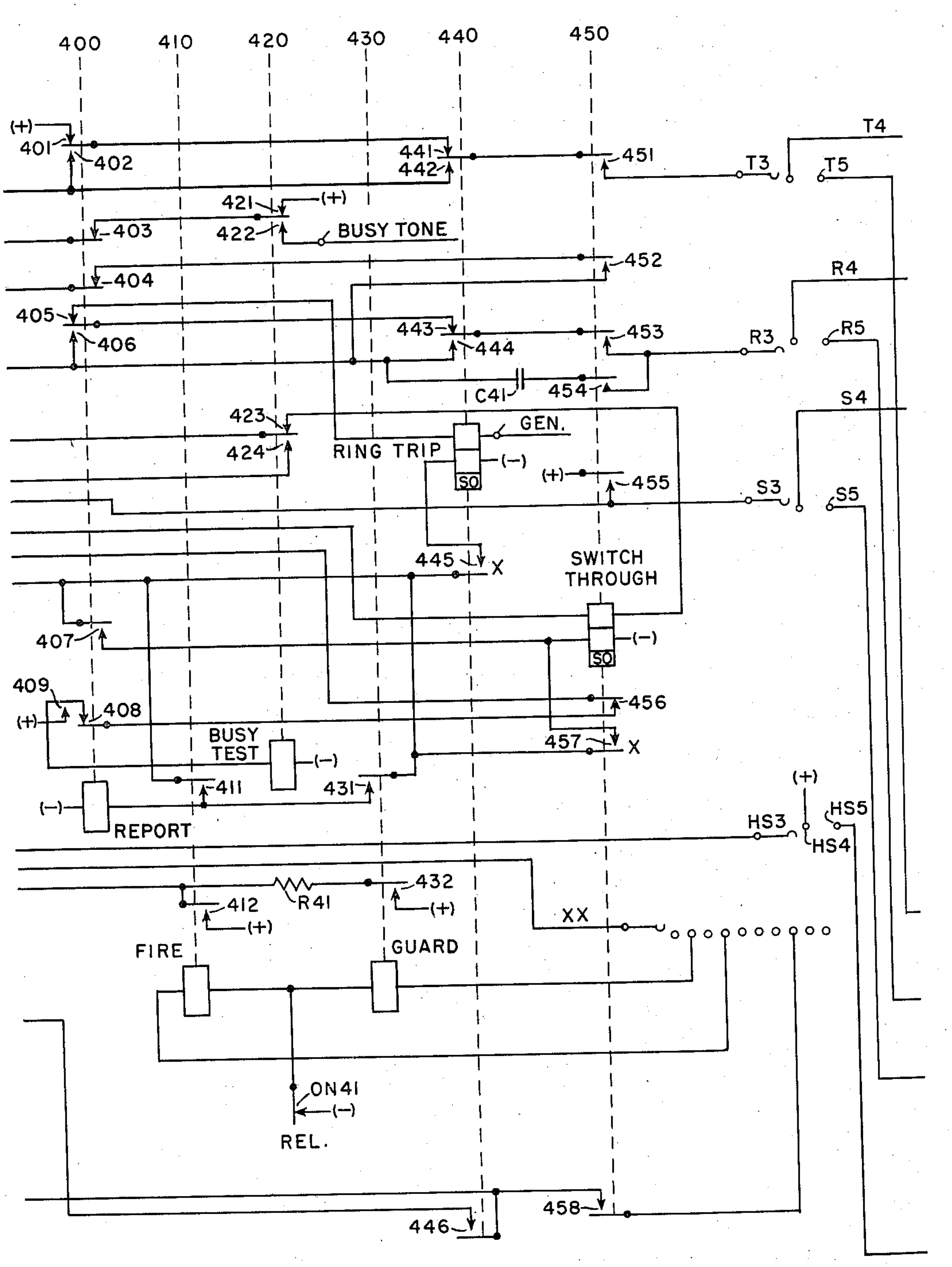

During the line finding operation, a loop is closed by the line finder circuit across conductors T2 and R2 to seize the connector of Figs. 3 and 4. When the line is found and the line finder switches through in the well known manner, conductors T1, R1, S1, and HS1 are metallically connected to conductors T2, R2, S2, and HS2, respectively. Calling bridge relay 300 of the connector operates over the extended loop and at its operated contacts 301, completes a circuit from ground on contacts ON31, associated with the release magnet M33 of the switch, to operate release delay relay 310. At contacts 311, relay 310 applies ground from contacts 351 to sleeve conductor S2 to hold the line finder and line circuit operated in the well known manner. At contacts 313, relay 310 closes an operating circuit for both the secondary delay relay 330 and the primary delay relay 340. Relay 330 operates from ground on contacts 313, through secondary off-normal contacts ON35, and through its upper winding to battery. Primary delay relay 340 operates from ground on contacts 313, through primary off-normal contacts ON36, and through its upper winding to battery. Dial tone is now connected through operated contacts 342 on relay 340, and through the upper winding of relay 300 to conductor T2 to inform the calling party that the circuits are now in condition to receive dial impulses from the calling line.

The dial impulses of the first digit serve to release and reoperate calling bridge relay 300, which repeats the impulses at its break contacts 302 to operate the primary magnet M31. The circuit extends from ground on contacts ON31, through break contacts 302, make contacts 314, make contacts 335, and through make contacts 343 to the primary magnet M31 and also to the lower winding of primary delay relay 340. The switch wipers are stepped one step in the primary direction with each operation of magnet M31. Primary off-normal contacts ON36 open during the first step of the wipers to deenergize the upper winding of relay 340. Both release delay relay 310 and primary delay relay 340 are so designed that they remain operated during the pulsing of relay 300. At the completion of the first digit, primary delay relay 340 releases to transfer the pulsing path to the secondary magnet M32 and to substitute ground on its contacts 341 for the dial tone previously applied by contacts 342. The impulses of the second digit are repeated by relay 300 through break contacts 344 on relay 340 to the secondary magnet M32 and to the lower winding of the secondary delay relay 330. Secondary off-normal contacts ON35 deenergize the upper winding of relay 330 when the switch steps off-normal in the secondary direction, but relay 330 remains operated over its lower winding for the duration of the second digit.

A busy test is made of the selected called line before relay 330 releases at the completion of the second digit. If the selected line is busy, ground appears on the sleeve brush S3 and is routed through operated contacts 333 on relay 330, break contacts 456 on relay 450, break contacts 408 on relay 400, and through the winding of busy test relay 420 to battery. When the secondary delay relay 330 releases, busy test relay 420 locks operated from ground on contacts 312 and through contacts 424, 332, 456, and 408. At contacts 422, relay 420 connects busy tone to the calling line by way of contacts 403, 331, the upper winding of answer bridge relay 320, and capacitor C31.

If it be assumed that the selected called line is not busy, busy test relay does not operate. When secondary delay relay 330 releases, switch-through relay 450 operates in series with the cutoff relay, such as relay 100, in the called line circuit over a circuit extending from ground on contacts 312, through contacts 423, the upper winding of relay 450, contacts 334, sleeve brush S3, over conductor SN of the called line circuit, through contacts 113 of the line relay of the called line circuit, and through the winding of the cutoff relay in the called line circuit to battery. Relay 450 closes a locking circuit for its lower winding from ground on contacts 313 through its operated preliminary make contacts 457 and at contacts 455, closes ground to brush S3 to operate the cutoff relay in the called line circuit. Also, in the called line circuit, the lock-out relay, corresponding to relay 140, operates to operate the dim lamp relay in that line circuit and thus dimly illuminate the line lamp associated with that line circuit at the attendant's station, as previously described.

Ringing is now applied to the tip and ring conductors of the called line over a circuit extending from conductor GEN through the upper winding of ring trip relay 440, contacts 405, contacts 443, contacts 453 to brush R3, through the ringer at the called station, over brush T3, through contacts 451, contacts 441, and contacts 401 to ground. A portion of the ringing current is coupled from ring brush R3 through contacts 454 and through capacitors C41 and C32 to inform the calling party that the called station is being rung.

When the call is answered at the called station, the loop closed at that station serves to operate ring trip relay 440. At contacts 445, relay 440 locks operated to ground supplied through contacts 313 on relay 310. Answer bridge relay 320 now operates over a circuit extending from ground on contacts 421, through contacts 403, 331, through its upper winding, through contacts 442, 451, over brush T3, through the loop closed at the called station, over brush R3, through contacts 453, contacts 444, contacts 452, contacts 404, and through its lower winding to battery. The calling and called parties are now connected for conversation since conductors T2 and R2 are coupled to brushes T3 and R3 by capacitors C31 and C32, respectively. Talking battery is supplied to the calling and called stations through the windings of calling bridge relay 300 and answer bridge relay 320, respectively.

When the calling party releases, relays 300, 310, 440, 320, and 450 release, release magnet M33 operates from ground on contacts 315 to release the switch, and ground is removed from the back sleeve conductor S2 at contacts 311 to release the preceding circuits.

Figure 5:
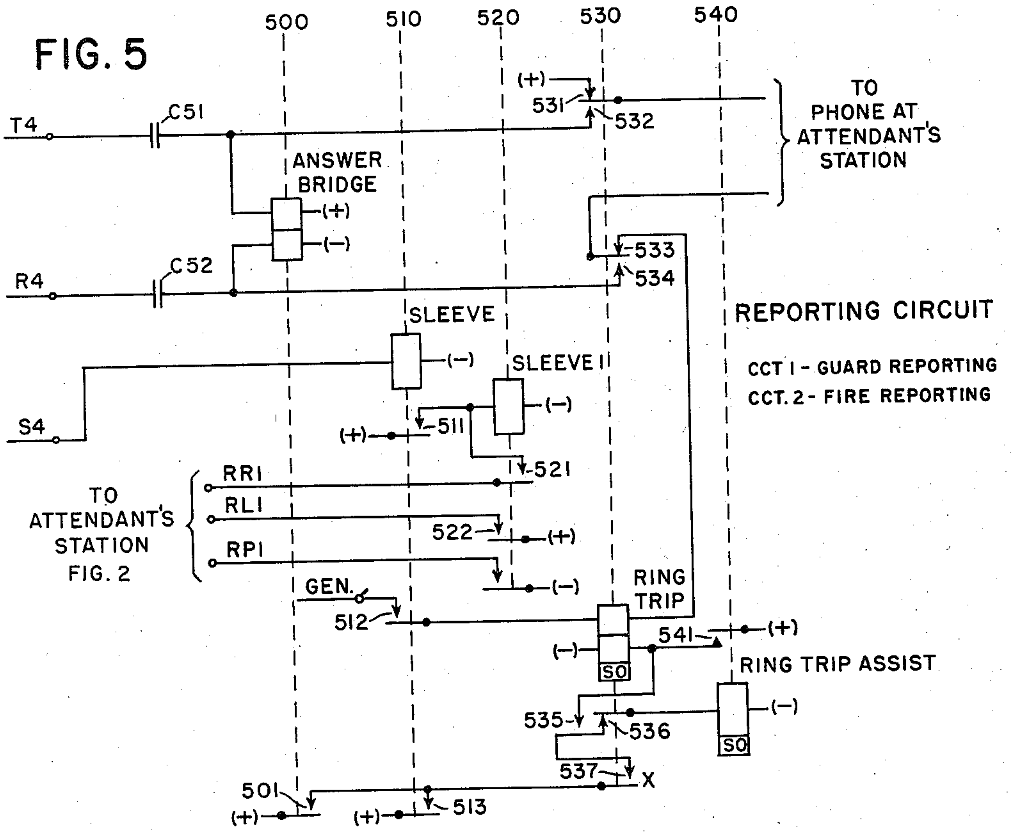
Fig. 5 shows details of a reporting circuit.

Next assume that STA 1 calls the guard reporting circuit of Fig. 5 which, for purposes of illustration only, has been shown as terminating in the second level of bank terminals associated with the connector brushes. When the connector brushes T3, R3, S3, and HS3 are moved into engagement with the set of terminals which terminate conductors T4, R4, S4, and HS4, ground on terminals HS4 is coupled over brush HS3, through break contacts 336 on secondary delay relay 330, which releases at the completion of the second digit as previously described, over brush XX, through the second terminal of the XX bank, the winding of guard relay 430, and through off-normal contacts ON41, associated with the release magnet M33, to battery. At its contacts 431, relay 430 connects an operating ground derived from contacts 313 to report relay 400. Relay 400, in operating, completes an operating circuit for busy test relay 420 at its contacts 409, and completes an operating circuit for switchthrough relay 450 at its operated contacts 407. At contacts 405, relay 400 opens the ringing circuit so that ringing current is not applied to the tip and ring brushes. Tip conductor T2 is now coupled to tip brush T3 through capacitor C31, contacts 402, contacts 441, and contacts 451, and ring conductor R2 is coupled to ring brush R3, through capacitor C32, contacts 406, contacts 443, and contacts 453. Thus, it can be seen that when the guard reporting line is selected, the calling line is switched through for conversational purposes to the reporting line whether that line is idle or busy.

If the reporting circuit of Fig. 5 is idle when selected by the connector, sleeve relay 510 operates from ground on operated contacts 455 of the switchthrough relay in the connector circuit. At contacts 511, relay 510 closes an obvious operating circuit for sleeve 1 relay 520 and at its contacts 512 connects generator through the upper winding of ring trip relay 530, contacts 533, through the ringer of a phone at the attendant's station, and through contacts 531 to ground. When the guard reporting phone is answered, a loop is closed by the phone to operate ring trip relay 530. Relay 530 first closes its preliminary make contact 537 to complete an operating circuit from ground on contacts 513, through break contacts 536, and through the winding of ring trip assist relay 540 for operating relay 540. At contacts 541, relay 540 closes direct ground to the lower winding of ring trip relay 530, which then locks operated through contacts 535 and 537. This method of operation for relays 530 and 540 is particularly important when the circuit of Fig. 5 is used as a fire reporting line since there may be a great number of stations associated with the first reporting line. This method of operation assures that ring trip relay 530 will not be falsely operated on the large ringing current drawn by a great number of stations across the line. Answer bridge relay 500 now operates from ground through its upper winding, through contacts 532, the loop at the called station, contacts 534, and through its lower winding to battery and at contacts 501 closes an alternate locking circuit for the relay 530.

Sleeve 1 relay 520 in the reporting circuit is now locked operated so that it will remain operated even if the call is abandoned by the calling party as indicated by the release of sleeve relay 510. The locking circuit for relay 520 extends from ground on its contacts 522, over conductor RL1 to the attendant's station of Fig. 2, through break contacts 211 on guard report release key 210, over conductor RR1, and through operated make contacts 521. At contacts 523, relay 520 applies battery potential to conductor RP1 to illuminate the guard pilot lamp L24 in Fig. 2. Thus, it can be seen that the guard pilot lamp is locked in until guard report release key 210 at the attendant's station is operated and that any number of calls may be made simultaneously to the reporting circuit since the connectors of the system are arranged to switch through the reporting circuit regardless of its idle or busy condition.

Returning to the connector circuit, it can be seen that the operation of guard relay 430 serves to close ground through contacts 432 and resistor R41 to conductor HS2. This ground is coupled from conductor HS2 through the line finder to conductor HS1 of the line circuit, through break contacts 151, and through the windings of discriminating relay 150 and bright lamp relay 130 to battery. The current flow in this circuit is sufficient to operate only relay 130. At contacts 132, relay 130 connects battery to line lamp L22 so that this lamp becomes brightly illuminated to indicate that the calling line has called a reporting circuit. At contacts 131, relay 130 also connects battery to line pilot lamp L21 which is common to all of the lines of the system. Bright lamp relay 130 locks operated from ground on conductor RL1, supplied by contacts 522 in the reporting circuit, through contacts 212 on key 210, contacts 133, and through its lower winding to battery. Thus, the lamp associated with the calling line circuit is locked-in in a bright condition until guard report release key 210 at the attendant's station is operated.

Next, assume that STA 1 calls the fire reporting line circuit which is identical to the guard reporting circuit just described except that it terminates in a different level, such as the fourth level for example, of the connector banks. When the fire reporting line is selected by the connector, fire relay 410 operates from ground on switch brush HS3 through break contacts 336 on relay 330, which releases at the end of the second digit as previously described, and through the fourth level of the XX banks. At contacts 411, relay 410 closes an operating circuit for report relay 400 which, as previously described, closes operating circuits for busy test relay 420 and switchthrough relay 450. Also, at contacts 412, relay 410 connects direct ground to conductor HS2 for the purpose of operating both relays 150 and 130 in the calling line circuit. Under these conditions, the bright lamp relay 130 in the calling line circuit is locked operated through contacts 222 of fire report release key 220, contacts 152, and through the windings of both relays 150 and 130 in series. Thus, it can be seen that when a call is extended to a guard reporting line, the lamp associated with the calling line can be extinguished only by operating the guard releasing key and, when a call is extended to the fire reporting line, the lamp associated with the calling line can be extinguished only by operating the fire report release key.

Figure 6:
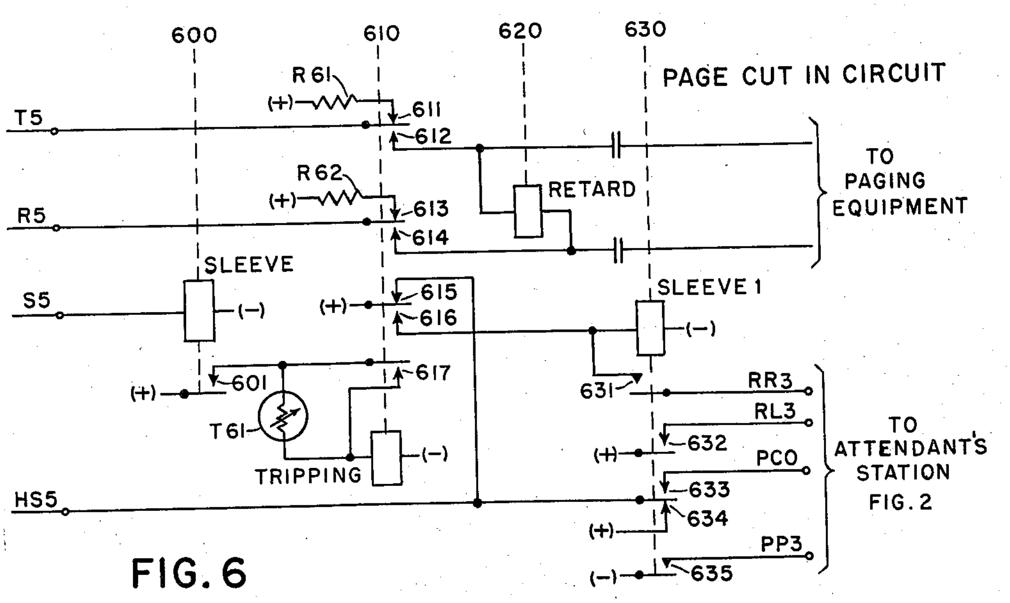
Fig. 6 shows details of a page cut-in circuit.

Next assume that STA 1 calls the page cut-in circuit of Fig. 6 which is shown as terminating in the eighth level of the connector banks. Only one connector at a time can seize the page cut-in circuit since a busy test is made before switch through of the circuit is effected. If the page cut-in circuit is idle when selected by the connector, relay 450 of the connector operates in series with sleeve relay 600. Ringing current applied to conductors T5 and R5 by the connector is tripped since conductors T5 and R5 are connected to ground through contacts 611 and resistor R61 and contacts 613 and resistor R62, respectively. At contacts 601, relay 600 closes an operating circuit for tripping relay 610 through thermistor T61. Since relay 610 is energized through a thermistor, it is relatively slow in operating, and during this predetermined time interval, ground on break contacts 615 of relay 610 and/or on break contacts 634 of relay 630 is applied to conductor HS5. In the connector, the ground on terminals HS5 is coupled over brush HS3, through contacts 336, over the XX brush, through the eighth level contact of the XX banks, through operated contacts 458 on relay 450, and through contacts 321 to operate page relay 360. It is to be noted that this ground is applied to the HS5 terminal simultaneously with the application of resistance ground to the conductors T5 and R5, but since ring trip relay 440 is slow-operate, relay 360 operates to open the circuit for relay 350 at contacts 362 before contacts 446 on relay 440 close. Direct ground is applied to conductor HS2 by contacts 361 of page relay 360 for the purpose of operating both the discriminating relay 150 and the bright lamp relay 130 in the calling line circuit, as previously described.

When tripping relay 610 finally operates, retard coil 620 is connected across conductors T5 and R5 by contacts 612 and 614 to operate answer bridge relay 320 in the connector circuit. Also, at contacts 616, relay 610 closes an operating circuit for sleeve 1 relay 630. When sleeve 1 relay 630 operates, ground is removed from conductor HS5 by contacts 634 to release page relay 360. The operating circuit for relay 360 is further opened by operated contacts 321 on answer bridge relay 320. Sleeve 1 relay 630 locks operated under control of page release key 200 at the attendant's station. The locking ground extends from ground through contacts 632 over conductor RL3, through contacts 201 on the page release key 200, over conductor RR3, and through contacts 631. Battery is connected through contacts 635 to conductor PP3 for the purpose of illuminating the page pilot lamp L23 at the attendant's station. It can now be seen that when the page cut-in circuit is seized, the page pilot lamp L23 is illuminated, the line lamp L22 associated with the calling line is illuminated brightly, and that these two lamps are locked in the illuminated condition under control of the page release key 200.

It may happen that an unauthorized person takes the paging equipment into use and it is, therefore, desirable that the attendant be able to forcibly release the connection. For this purpose, the operation of page release key 200 serves to connect ground through contacts 203 to conductor PC0 and through operated contacts 633 of relay 630 to conductor HS5. In the connector circuit, ground connected to terminal HS5 at this time is coupled over brush HS3 and brush XX, through contacts 458, 446, and 362 to operate the page cutoff relay 350. At contacts 351, relay 350 removes ground from the sleeve conductor S2 to release the connection. When the line finder releases, the loop is opened to calling bridge relay 300 to release the connector, as previously described. In the calling line circuit, cutoff relay 100 releases, line relay 110 reoperates and, at contacts 114, holds lock-out relay 140 operated. Thus, the calling line is placed in the the lock-out condition and the allotter start lead is not energized since contacts 143 on relay 140 are open.

The release of the connector circuit also results in the release of sleeve relay 600 and since the page release key is operated at this time, relay 630 also releases. If a call should be made to the page cut-in circuit and then abandoned before the page release key is operated, relays 600 and 610 release but relay 630 remains operated under control of the page release key. Ground potential is applied to conductor HS5 through break contacts 615 of relay 610 so that another calling line taking the circuit into use at this time will be properly identified at the attendant's position.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a telephone system, a plurality of regular line circuits, a special service line circuit, an attendant's station, a plurality of indicating devices individually corresponding to each of said regular line circuits at said attendant's station, a directively controllable connector having access to said regular line circuits and to said special service line circuit, means for extending a connection from a calling one of said regular line circuits to said connector, means in said connector responsive when said connector is controlled to select said special service line circuit for returning a distinctive marking over said extended connection to said calling line circuit, means in said calling line circuit responsive to the receipt of said distinctive marking for activating the device corresponding to said calling line circuit, and operable means at said station for forcibly releasing said connector whenever said special service line circuit is selected by said connector.

2. In a telephone system, a plurality of regular line circuits, a special service line circuit, a directively controllable connector comprising a plurality of brushes having access to respective banks of terminals, said special service line circuit comprising a plurality of conductors connected to corresponding terminals in said bank of terminals, means in said special service line circuit for normally applying a potential to one of said conductors, means for extending a connection from a calling one of said regular line circuits to said connector, said connector then being controlled by directive impulses received from the calling line circuit to select the desired called line, means in said special line circuit for removing the potential from said one conductor a predetermined time interval after said circuit is selected by said connector, means in said connector responsive to the application of said potential to said one conductor during said predetermined time interval for returning a class of called line marking signal to said calling line circuit, means for applying a potential to said one conductor after said predetermined time interval has elapsed, and means in said connector responsive to the application of said potential to said one conductor after said predetermined time interval has elapsed for forcibly releasing said connection.

3. In a telephone system, a plurality of regular line circuits, a special service line circuit, an attendant's station, a plurality of indicating devices individually corresponding to each of said regular line circuits at said attendant's station, a directively controllable connector comprising a plurality of brushes having access to respective banks of terminals, said special service line circuit comprising a plurality of conductors connected to corresponding terminals in said banks of terminals, means in said special service line circuit for normally applying a potential to one of said conductors, means for extending a connection from a calling one of said regular line circuits to said connector, said connector then being controlled by directive impulses received from the calling line circuit to select the desired called line, means in said special line circuit for removing the potential from said one conductor a predetermined time interval after said circuit is selected by said connector, means in said connector responsive to the application of said potential to said one conductor during said predetermined time interval for returning a marking signal over said extended connection to said calling line circuit, means in said calling line circuit responsive to the receipt of said signal for activating the device corresponding to said calling line circuit, operable means at said attendant's station for applying a potential to said one conductor after said predetermined time interval has elapsed, and means in said connector responsive to the application of said potential to said one conductor after said predetermined time interval has elapsed for forcibly releasing the extended connection.

4. In a telephone system, a plurality of regular line circuits, first and second special service line circuits, a directively controllable connector having access to said regular line circuits and to said first and second circuits, means for extending a connection from a calling regular line circuit to said connector, means in said connector responsive when said connector is controlled to select said first circuit for returning a first distinctive marking over said extended connection to said calling line circuit, means in said connector responsive when said connector is controlled to select said second circuit for returning a second distinctive marking over said extended connection to said calling line circuit, an attendant's station, a plurality of indicating devices individually corresponding to each of said regular line circuits at said attendant's station, means in said calling line circuit responsive to the receipt of either said first or second distinctive marking for activating the device corresponding to said calling line circuit, first operable means at said attendant's station for inactivating said calling line circuit device when the call has been extended to said first circuit as determined by the receipt of said first distinctive marking by said calling line circuit, and second operable means at said attendant's station for inactivating said calling line circuit device when the call has been extended to said second circuit as determined by the receipt of said second distinctive marking by said calling line circuit.

5. In a telephone system, a plurality of regular line circuits, first and second special service line circuits, a two-motion, step-by-step connector comprising a set of brushes, a terminal bank divided into levels, means for advancing the brushes to select any level, and means for advancing the brushes in any level to select a particular set of terminals, said last two means being controlled by directive impulses incoming to said connector from a calling one of said regular line circuits, means for terminating some of said regular line circuits and said first special service line circuit on different sets of terminals in a first level of said bank, means for terminating others of said regular line circuits and said second special service line circuit on different sets of terminals in a second level of said bank, means in said connector responsive to the selection of the set of terminals terminating said first special line circuit for returning a first distinctive marking signal to said calling line circuit, and means in said connector responsive to the selection of the set of terminals terminating said second special line circuit for returning a second distinctive marking signal to said calling line circuit.

6. In a telephone system, a plurality of regular line circuits, first and second special service line circuits, a two-motion step-by-step connector comprising a set of brushes, a terminal bank divided into levels, means for advancing the brushes to select any level, and means for advancing the brushes in any level to select a particular set of terminals, said last two means being controlled by directive impulses incoming to said connector from a calling one of said regular line circuits, means for terminating some of said regular line circuits and said first special service line circuit on different sets of terminals in a first level, means for terminating others of said regular line circuits and said second special service line circuit on different sets of terminals in a second level, means in said connector responsive to the selection of said first special service line circuit for returning a first distinctive signal to said calling line circuit, means in said connector responsive to the selection of said second special service line circuit for returning a second distinctive signal to said calilng line circuit, an attendant's station, a plurality of indicating devices individually corresponding to each of said regular line circuits at said attendant's station, means in said calling line circuit responsive to the receipt of either said first or second signals for activating the device corresponding to said calling line circuit, first operable means at said attendant's station for inactivating said calling line circuit device when the call has been extended to said first special service line circuit, and second operable means at said attendant's station for inactivating said calling line circuit device when the call has been extended to said second special service line circuit.

References Cited in the file of this patent

FOREIGN PATENTS 673,249 Great Britain ------------ June 4, 1952

UNITED STATES PATENT OFFICE

CERTIFICATE OF CORRECTION

Patent No. 2,854,522 September 30, 1958

George W. Killian

It is hereby certified that error appears in the printed specification of the above numbered patent requiring correction and that the said Letters Patent should read as corrected below.

Column 5, line 28, for "first" read -- fire --; column 7, line 23, strike out "the", first occurrence; column 10, line 10, for "caliing" read -- calling --.

Signed and sealed this 5th day of May 1959.

(SEAL)
Attest:

KARL H. AXLINE
Attesting Officer

ROBERT C. WATSON
Commissioner of Patents